United States Patent
Brandenburg

(10) Patent No.: US 6,841,627 B2
(45) Date of Patent: Jan. 11, 2005

(54) GRAFT COPOLYMERS OF METHYLENE LACTONES AND PROCESS FOR EMULSION POLYMERIZATION OF METHYLENE LACTONES

(75) Inventor: Charles J. Brandenburg, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 147 days.

(21) Appl. No.: 10/305,854

(22) Filed: Nov. 27, 2002

(65) Prior Publication Data

US 2003/0171522 A1 Sep. 11, 2003

Related U.S. Application Data

(60) Provisional application No. 60/334,392, filed on Nov. 30, 2001.

(51) Int. Cl.$^7$ .............. C08F 279/02; C08F 6/22
(52) U.S. Cl. ............. 525/386; 524/458; 525/331.9; 525/333.1; 525/333.2
(58) Field of Search ............. 524/458; 525/331.9, 525/333.1, 333.2, 386

(56) References Cited

U.S. PATENT DOCUMENTS

| | | | |
|---|---|---|---|
| 3,678,133 A | 7/1972 | Ryan | |
| 3,793,402 A | 2/1974 | Owens | |
| 3,808,180 A | 4/1974 | Owens et al. | |
| 3,825,622 A | * 7/1974 | Robeson et al. | 525/69 |
| 3,985,703 A | 10/1976 | Ferry et al. | |
| 4,136,136 A | * 1/1979 | Dreyfuss et al. | 525/330.8 |
| 4,180,494 A | 12/1979 | Fromuth et al. | |
| 4,543,383 A | 9/1985 | Heil et al. | |
| 5,625,001 A | 4/1997 | Makower et al. | |
| 5,998,554 A | 12/1999 | Yokoo | |

FOREIGN PATENT DOCUMENTS

WO   WO 99/12986   3/1999

OTHER PUBLICATIONS

Peter A. Lovell and Dorian Pierre, Rubber–toughened Plastics, Emulsion Polymerization and Emulsion Polymers. Ch. 19, pp. 657–695, (1997).
D. Arnoldi, K. Dorn, H. Schwind, T. Habkert and D. Hauch, Hanau, Warmeformbestandding und optisch brillant, Kunststoffe, 87, (1997), pp. 734–736.
C. B. Bucknall, Blending, Toughened Plastics, pp. 99–102, (1997), Applied Science Publishers LTD, London.
R. J. Young and P. A. Lovell, Introduction to Polymers, second edition, pp. 65–68, (1991).
Charles E. Carraher, Jr. and Seymour, Polymer Chemistry, fifth edition, pp. 339–348, (2000).

* cited by examiner

*Primary Examiner*—Kelechi C. Egwim

(57) ABSTRACT

This invention discloses resilient, acrylic graft polymers comprising α-methylene lact(one)(am) monomers such as α-methylene-γ-butyrolactone, and blends of such polymers with thermoplastic matrix resins.

This invention also discloses hard, non-resilient, acrylic graft polymers comprising α-methylene lact(one)(am) monomers such as α-methylene-γ-butyrolactone, and to blends of such polymers with thermoplastic matrix resins.

This invention further discloses a general process for emulsion polymerization of α-methylene lact(one)(am) monomers such as α-methylene-γ-butyrolactone and its copolymers.

1 Claim, 3 Drawing Sheets

GRAFT COPOLYMERS OF METHYLENE LACTONES AND PROCESS FOR EMULSION POLYMERIZATION OF METHYLENE LACTONES

This application claims benefit of Provisional Application No. 60/334,392 filed Nov. 30, 2001.

FIELD OF THE INVENTION

This invention relates to resilient, acrylic graft polymers derived from α-methylene lact-(ones)(ams) such as α-methylene-γ-butyrolactone (MBL), and to blends of such polymers with thermoplastic matrix resins.

This invention also relates to hard, nonresilient, acrylic graft polymers derived from α-methylene lact(ones)(ams) such as α-methylene-γ-butyrolactone (MBL), and to blends of such polymers with thermoplastic matrix resins.

This invention further relates to a general process for emulsion polymerization of α-methylene lact(ones)(ams) such as α-methylene-γ-butyrolactone (MBL) and its copolymers.

BACKGROUND OF THE INVENTION

Resilient, acrylic graft polymers are produced by a multi-stage, sequential polymerization technique which comprises alternately producing resilient and nonresilient layers around an acrylic core material. Such materials are often referred to as "core/shell particles" or "core/shell tougheners". These resilient polymers are ordinarily mixed with a hard nonresilient thermoplastic methacrylic matrix resin in order to provide toughness in articles molded from the resulting blend. When properly dispersed, the resilient acrylic graft polymer greatly improves the impact strength of the hard matrix resin while maintaining a balance of important physical properties of heat distortion temperature, flexural modulus, tensile strength and tensile elongation.

A number of patents and papers address polymer morphology that can be obtained by multi-stage emulsion polymerization. For a detailed discussion, see P. Lovell, M. El-Aasser *Emulsion Polymerization and Emulsion Polymers,* John Wiley and Sons, 1997, chapter 19. See also U.S. Pat. Nos. 5,625,001 and 5,998,554, 3,678,133, 3,793,402, 3,808,180, 3,985,703, 4,180,494, 4,543,383 and World Patent Application 99/12986. The above art provides a description of monomers, emulsifiers, graft-linking monomers, cross-linking monomers, initiators, and the like, useful in making staged (meth)acrylic emulsion polymers.

Polymeric MBLs are characterized by high glass transition temperatures, but are often quite brittle. See for instance U.S. Pat. No. 5,880,235 and the discussion at columns 1–3, and D. Arnoldi, et al., Kunststoffe, vol. 87, p. 734–736 (1997). Commercially available acrylic graft copolymers, such as the Paraloid® series of products sold by Rohm and Haas Co., Philadelphia, Pa., U.S.A., can be used to toughen MBL-containing polymers. However, an important criterion for toughening is the compatability of the shell of the core/shell particle with the matrix polymer. Poor compatibility leads to particle agglomeration, which results in poor physical properties in the resulting molded product. Thus, if one could use multistage graft copolymers derived from MBLs to toughen matrix resins containing MBLs without compromising their other superior properties, useful compositions would result. In addition, functional groups can be incorporated in the outer shell of the MBL-containing graft copolymer to improve compatibility with other thermoplastic polymers such as polyolefins, polyamides, polyesters, polycarbonates, polystyrenes, ABS-type polymers, polyacetals, polyethers, polyurethanes, poly(vinyl chloride), blends thereof and mixtures thereof.

Another aspect of the present invention is a process for preparing hard, nonresilient, cross-linked polymers from MBLs. These polymers have a fixed particle size and act as nano-sized (less than about 500 nanometer), pre-formed, high glass transition temperature ($T_g$) amorphous "filler" materials. When properly blended with thermoplastic resins, the resulting materials display much higher heat distortion temperatures than the thermoplastic alone.

This invention further discloses an emulsion polymerization process of preparing MBL-based homopolymers and copolymers. A general emulsion polymerization process is described in "Polymer Chemistry," by Seymour and Carraher, fifth edition, Marcel Dekker, Inc. NY, 2000 and "Introduction to Polymers," Young and Lovell, second edition, Chapman & Hall, 1991.

U.S. Pat. No. 3,444,148 to Adelman in Example 10 teaches synthesis of a ⅙(w/w) γ,γ-bis-trifluromethyl MBL/acrylonitrile copolymer via emulsion polymerization. However, there is no teaching for synthesis of higher MBL content copolymers and MBL homopolymers via emulsion polymerization. The distinctive feature of emulsion polymerization is the ease with which comonomer ratios can be adjusted during the reaction. For a detailed discussion, see C. B. Bucknall, *Toughened Plastics,* Applied Science Publishers, 1977, p. 99. In addition, the heats of reaction, particle size, molecular weight, and molecular weight distribution can be carefully controlled. Within the scope of the present invention, the MBL core/shell latex can be easily mixed with the MBL copolymer latex in the desired ratio and then coagulated together. Although this is commonly done, for example, in the manufacture of acrylonitrile/butadiene/styrene based polymers via emulsion, (see P. Lovell, M. El-Aasser *Emulsion Polymerization and Emulsion Polymers,* John Wiley and Sons, 1997, p. 668–670), the process has never been suggested for the preparation of MBL-based homopolymers and copolymers.

Among the uses of thermoplastics are those in which the optical properties of the polymer are important, particularly when the polymer is an optically clear material with little distortion of optical images. Such polymers, for example poly(methyl methacrylate) (PMMA) and certain polycarbonates are used as substitutes for glass where toughness is important, such as for safety glazing and signage. In uses where toughness is important, additional properties such as weather and/or heat resistance may also be important. For example, if a material needs to be thermally sterilized, it must withstand the temperature of the sterilization process. Polycarbonates often have poor weathering and/or hydrolysis resistance, while PMMA has a relatively low glass transition temperature ($T_g$), so its heat resistance is poor. Thus, polymers with a combination of good optical properties, and heat and weathering resistance are desired.

An important criterion for optical clarity is that the refractive index (RI) of the acrylic graft copolymer match that of the matrix thermoplastic to within 0.1% of refractive index units. This can be done by adjusting the ratio of styrene (RI of 1.590) to n-butyl acrylate (RI of 1.466) in the rubbery phase of the acrylic graft copolymer. While this technique is common to PMMA (RI 1.490), it has not yet been demonstrated with polymers of MBL (RI of 1.540) or polymers of γ-methyl MBL (RI of 1.510). The present invention teaches a process for making transparent polymer compositions can be obtained from multi-stage graft copolymer blends of MBL and γ-methyl-MBL (Me-MBL).

The acrylic copolymers and compositions of the invention are of use as molded parts, thermoform parts, sheets, films, foams, containers, bottles, pipes, profiles and other articles made in accordance with the invention.

SUMMARY OF THE INVENTION

The invention relates to an acrylic copolymer comprising at least a first polymeric repeat unit represented by Formula I, derived from α-methylene lact(one)(am) monomer,

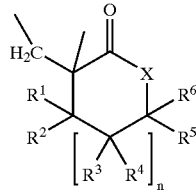

(I)

wherein:

n is 0, 1 or 2;

X is —O— or —NR$^9$—; and

R$^1$, R$^2$, R$^5$, R$^6$, R$^9$, each of R$^3$, and each of R$^4$, are independently hydrogen, a functional group, hydrocarbyl or substituted hydrocarbyl.

The invention also relates to a process for producing an acrylic copolymer comprising the sequential steps of:

(a) graft polymerizing α-methylene-γ-butyrolactone or γ-methyl-α-methylene-γ-butyrolactone onto a polymerized butadiene or butadiene-copolymer to form a latex, and (b) isolating the resulting latex by coagulation, freeze drying, or spray drying.

DETAILED DESCRIPTION OF THE INVENTION

Figure 1:
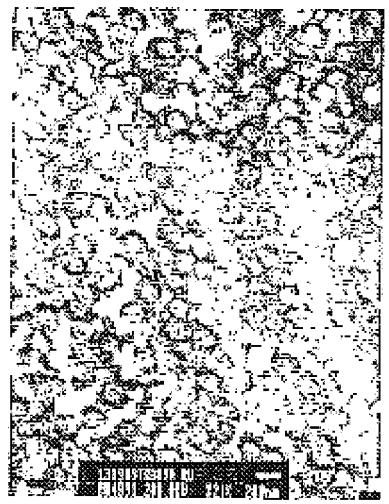
FIG. 1 is a TEM analysis of a film of MeMBL core/shell particles from Example 13.

The terms used in the present invention are defined below.

The term "α-methylene lact(ones)(ams)" as used herein refers to monomers of α-methylene lactones and monomers of α-methylene lactams. The polymers of the present invention can comprise either one or both monomers of α-methylene lactones and monomers of α-methylene lactams.

A "hydrocarbyl group" is a univalent group containing only carbon and hydrogen. If not otherwise stated, it is preferred that hydrocarbyl groups (and alkyl groups) herein contain 1 to about 30 carbon atoms.

By "substituted hydrocarbyl" herein is meant a hydrocarbyl group which contains one or more substituent groups which are inert under the process conditions to which the compound containing these groups is subjected. The substituent groups also do not substantially interfere with the process. If not otherwise stated, it is preferred that substituted hydrocarbyl groups herein contain 1 to about 30 carbon atoms. Included in the meaning of "substituted" are heteroaromatic rings. In substituted hydrocarbyl all of the hydrogens may be substituted, as in trifluoromethyl.

By "functional group" herein is meant a group other than hydrocarbyl or substituted hydrocarbyl which is inert under the process conditions to which the compound or polymer containing the group is subjected. The functional groups also do not substantially interfere with any process described herein that the compound or polymer in which they are present may take part in. Examples of functional groups include halo (fluoro, chloro, bromo and iodo), ether such as —OR$^{22}$ wherein R$^{22}$ is hydrocarbyl or substituted hydrocarbyl.

By "reactive functional group" is meant a functional group that may react with another functional group present in the process or composition. By "may react" is meant that the functional group may react with its counterpart reactive group, but it is not necessary that such reaction happen or that all of the reactive functional groups react with one another. Usually in the formation of the compositions described herein, some fraction of these reactive functional groups will react.

By "derived from" is meant that the polymer is prepared from the monomers set forth in the particular embodiment as commonly known and referred to by persons skilled in the art.

By "copolymerizable under free radical conditions" is meant that the (potential) monomers, preferably vinyl monomers, involved are known to copolymerize under free radical polymerization conditions. The free radicals may be generated by any of the usual processes, for example thermally from radical initiators such as peroxides or azonitriles, by UV-radiation using appropriate sensitizers, etc., and by ionizing radiation. These polymers may be prepared by various types of processes, such as continuous, batch, and semibatch, which are well known in the art. Many combinations of free radically copolymerizable monomers are known, see for instance, J. Brandrup, et al., Ed., Polymer Handbook, 4$^{th}$ Ed., John Wiley & Sons, New York, 1999, p. II/181–II/308.

By "an elastomeric or rubbery polymer" is meant a polymer having a flexural modulus (of unfilled pure elastomeric polymer) of 35 MPa or less as measured by the ASTM D790 method, and having a T$_g$ of less than 30° C., preferably having a T$_g$ of less than 0° C. Glass transition temperatures are measured by the ASTM D3418 method at a heating rate of 20° C./min. The T$_g$ is measured as the midpoint of the transition of the glass transition temperature.

By "batch emulsion polymerization" is meant that all ingredients, including monomers, surfactants, and chain transfer agents, are added at the beginning of the polymerization. The polymerization begins as soon as initiator is added.

By "semi-continuous emulsion polymerization" is meant that one or more of the ingredients is added continuously or in incremental amounts. The monomers may be added in pure form or as pre-made emulsions. This process is advantageous over the batch process by allowing better control over heat of reaction, particle number, colloidal stability, coagulum formation, and particle morphology.

By "continuous emulsion polymerization" is meant that one or more ingredients is fed continuously to a polymerization tank or series of tanks and the polymer product (latex) is continuously removed at the same rate. By "low-temperature emulsion polymerization" is meant that emulsion polymerization reaction is carried out with a redox-type initiator.

Optionally, cross-linked homopolymers based on repeating units of α-methylene lact(one)(am) (of Formula II), are herein prepared by emulsion polymerization,

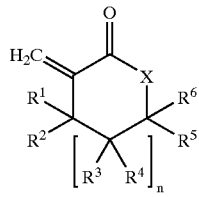
(II)

wherein:
n is 0, 1 or 2;
X is —O— or —NR$^9$—; and
R$^1$, R$^2$, R$^5$, R$^6$, R$^9$, each of R$^3$, and each of R$^4$, are independently hydrogen, a functional group, hydrocarbyl or substituted hydrocarbyl.

Optionally, cross-linked copolymers based on repeat units of α-methylene lact(one)(am) (Formula II) are also herein prepared by emulsion polymerization.

Optionally, cross-linked copolymers wherein at least one repeat unit is α-methylene lact(one)(am) (Formula II) and at least one other repeat unit is a free-radically polymerizable monomer, are also prepared by emulsion polymerization. Preferably, the free-radically polymerizable monomer-based repeat units have the following Formulae:

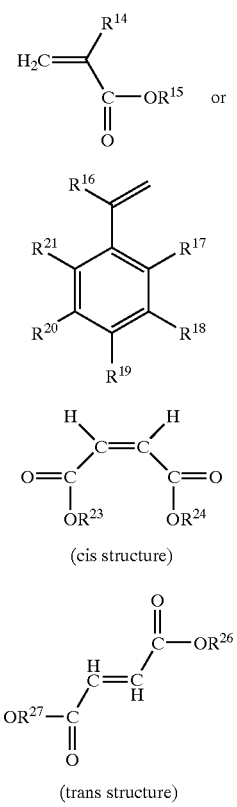

(V)

(VI)

(VII) (cis structure)

(VIII) (trans structure)

wherein R$^{14}$ is hydrogen or methyl, and R$^{15}$ is hydrocarbyl or substituted hydrocarbyl, preferably alkyl, and R$^{16}$ is hydrogen or methyl and R$^{17}$, R$^{18}$, R$^{19}$, R$^{20}$ and R$^{21}$ are each independently hydrogen, hydrocarbyl substituted hydrocarbyl or a functional group. In a preferred embodiment of the compound of Formula (V), R$^{14}$ and R$^{15}$ are both methyl (methyl methacrylate), and in a preferred embodiment of the compound of Formula (VI), R$^{16}$, R$^{17}$, R$^{18}$, R$^{19}$, R$^{20}$ and R$^{21}$ are all hydrogen (styrene), and R23, R24, R26, and R27 are methyl, ethyl or butyl.

Multi-stage, core/shell polymeric particles are herein prepared by the process of emulsion polymerization. In this process, each successive stage is polymerized in the presence of previously formed stages. Thus, each successive stage is polymerized as a layer on top of the immediately preceding stage. Depending on the properties desired, the first stage may comprise a seed surrounded by more first stage. Thus, the first stage or the portion of the first stage is used as a seed or "core", around which either more of the first stage or the subsequent stages known as shells are polymerized in layers. The first stage or a portion thereof, which forms the core provides a mechanism for determining final particle size; for once the core particles are formed, subsequent polymerization of the stage tends to result in polymerization on the existing particles, i.e., generally new particles do not form. Thus, the final particle size is controlled by the number of first stage core particles.

A preferred embodiment of a multi-stage, core/shell particle consists of a core and two shells. The inner shell is known as the intermediate layer.

The multi-stage, sequentially produced polymer herein comprises repeat units derived from the monomer represented by Formula (II) above.

In particularly preferred embodiments of compounds of Formula (II), n is 0, X is —O— and R$^1$, R$^2$, R$^5$ and R$^6$ are hydrogen, or n is 0, X is —O—, R$^6$ is methyl, and R$^1$, R$^2$ and R$^5$ are hydrogen. Other preferred embodiments of compounds of Formula (II) are set forth in U.S. Pat. No. 5,880,235, which is hereby incorporated by reference, at column 4, line 44 to column 8, line 59.

A free radically polymerizable monomer may also be present in the multi-stage, sequentially produced polymer. Preferably these repeat units are derived from monomers of Formulae (V) and (VI) above.

In a preferred embodiment of the compound of Formula (V), R$^{14}$ and R$^{15}$ are both methyl (methyl methacrylate), and in a preferred embodiment of the compound of Formula (VI), R$^{16}$, R$^{17}$, R$^{18}$, R$^{19}$, R$^{20}$ and R$^{21}$ are all hydrogen (styrene).

The core of the core/shell multi-stage polymeric particle may be cross-linked and is a polymer selected from:

(a) a polymer or a copolymer derived from at least one α-methylene lact(one)(am) monomer represented by Formula I above, (b) a polymer or a copolymer derived from at least one other free-radically polymerizable monomer of Formula (V) or Formula (VI) above, (c) a copolymer derived from at least one α-methylene lact(one)(am) monomer represented by Formula II and at least one other free-radically copolymerizable monomer, (d) an optionally cross-linked polymer derived from at least one conjugated diolefin monomer, (e) an optionally cross-linked polymer derived from at least one vinyl monomer, and (f) an optionally cross-linked polymer derived from at least one conjugated diolefin monomer and one vinyl monomer.

The shell of the core/shell multi-stage polymeric particle may be cross-linked and is a polymer selected from:

(a) a polymer or a copolymer derived from at least one α-methylene lact(one)(am) monomer represented by Formula II above, (b) a polymer or a copolymer derived from at least one other free-radically polymerizable monomer of Formula (V) or Formula (VI) above, (c) a copolymer derived from at least one α-methylene lact(one)(am) monomer represented by Formula II and at least one other free-radically copolymerizable monomer, (d) an optionally cross-linked polymer derived from at least one conjugated diolefin monomer, (e) an optionally cross-linked polymer derived from at least one vinyl monomer, and (f) an optionally cross-linked polymer derived from at least one conjugated diolefin monomer and one vinyl monomer.

If the multi-stage sequential polymer comprises of an intermediate layer, the intermediate layer comprises a polymer selected from:

(a) a polymer derived from at least one α-methylene lact(one)(am) monomer represented by Formula II, (b) a polymer derived from at least one free radically polymerizable monomer, (c) a copolymer derived from at least one α-methylene lact(one)(am) monomer represented by Formula II and at least one other free radically polymerizable monomer, (d) an optionally cross-linked polymer, derived from at least one conjugated diolefin monomer, (e) an optionally cross-linked polymer, derived from at least one vinyl monomer, and (f) an optionally cross-linked polymer derived from at least one conjugated diolefin monomer and one vinyl monomer.

The resilient, acrylic graft polymers derived from α-methylene lact(ones)(ams) such as α-methylene-γ-butyrolactone (MBL), are blended with thermoplastic matrix resins in this invention. The non-resilient, acrylic graft polymers derived from α-methylene lact(ones)(ams) such as MBL, are also blended with thermoplastic matrix resins in this invention. A thermoplastic resin based on a polymer or copolymer of α-methylene lact(ones)(ams) such as MBL is preferred for the blending.

A homopolymer or copolymer derived from MBL monomer and the methyl methacrylate monomer is preferred as the matrix resin for blending. The weight fraction of MBL in the copolymer ranges from 0% to 100%. The number average molecular weight of the homopolymer or copolymer ranges from about 5,000 to about 100,000. More preferably, the number average molecular weight of the homopolymer or copolymer ranges from about 40,000 to about 70,000.

Polyamide resin is also preferred as the matrix resin for blending with multi-stage polymeric particles prepared by this invention. Polyamides useful for compositions of this invention include conventional polyamide resins known as nylon resins, including both aliphatic polylactams such as polycaprolactam (nylon 6) and higher analogs such as nylon 11 and nylon 12, and polyamides formed from aliphatic diamines and aliphatic dicarboxylic acids such as polyhexamethylene sebacamide (nylon 6,10) polyhexamethylene adipamide (nylon 6,6), and the like. Further examples of useful polyamides include the amorphous as well as the crystalline versions, the toughened polyamides, and the aromatic-aliphatic copolymers, terpolymers and tetrapolymers. A great variety of these nylon resins are well known and widely available commercially.

Cross-linked, multi-stage particles are preferred for addition to polyamide resin. Preferably, cross-linked particles of MBL homopolymer, MBL copolymer with methacrylic acid, MBL copolymer with methacrylamide, MBL copolymer with itaconic anhydride, or MBL copolymer with maleic anhydride are used as impact modifiers for the polyamide resin.

Combining the multi-stage polymeric particles and thermoplastic polymeric resins may be accomplished by any of the common melt-blending processes, including the use of compounding extruders, Banbury mixers, roll mills, and the like. The powdered or pelletized resins may be dry-blended, then fed to the processing equipment, or alternatively, the resinous components may be fluxed in the melt processing equipment, with subsequent addition of multi-stage impact modifiers.

Generally the graft polymers or the multi-stage polymers are present in an amount of about 1% to about 80% by weight of the blend, preferably from about 30% to about 70%, and more preferably from about 55% to about 65%.

The final particle size of the multistage core/shell particle prepared by the method of this invention is between about 100 nanometer to about 500 nanometer, and more preferably from about 200 to about 300 nanometer.

A preferred core weight content range is from about 10% to about 90% of the total weight of the multiphase polymeric particle. A more preferred core weight content range is from about 20% to about 80%. A further preferred core weight content range is from about 20% to about 30%.

A preferred intermediate shell weight content range is from 0% to about 60% of the total weight of the multiphase polymeric particle. A more preferred intermediate shell weight content range is from about 35% to about 65%. A most preferred intermediate weight content range is from about 45% to about 55%.

A preferred outer shell weight content range is from about 0% to about 35% of the total weight of the multiphase polymeric particle. A more preferred outer shell weight content range is from about 5% to about 30%. A further preferred outer weight content range is from about 15% to about 25%.

Emulsion polymerization temperatures can range from 25° C. to about 100° C., preferably from about 60° C. to about 80° C.

Preferred initiators for the polymerization process include thermal type initiator systems. Examples of thermal initiators include organo peroxides, acetyl peroxides, lauroyl peroxide, t-butyl peroxide, di-t-butyl hydroperoxide, peresters, such as t-butyl peroxypivulates; azo-type initiators, such as azo-bis-isobutyrylnitrile; persulfates, such as sodium, potassium, or ammonium persulfate; and peroxyphosphastes, such as sodium, potassium, or ammonium peroxyphosphate.

Preferred initiators for the polymerization process also include redox-type initiator systems. Redox initiators include, for example, a combination of a hydroperoxide, such as hydrogen peroxide, t-butyl hydroperoxide, cumene hydroperoxide, diisopropyl-benzene hydroperoxide, and the like, and a reducing agent, such as sodium, potassium, or ammonium bisulfite, metabisulfite, or hydrosulfite, sulfur dioxide, hydrazine, ferrous salts, isoascorbic acid, and sodium formaldehyde sulfoxalate.

Suitable surfactants for the polymerization process include alkali metal, ammonium salts of alkyl, aryl, alkaryl, ara-alkyl sulfonates, sulfates and polyether sulfates, ethoxylated fatty acids, esters, alcohols, amines, amides, alkyl phenolics, complex organo-phosphoric acids, and their alkali metal and ammonium salts.

Suitable chain transfer agents for the emulsion polymerization process include mercaptans, polymercaptans, and polyhalogen compounds.

Suitable coagulants for the emulsion polymerization process includes magnesium sulfate, sodium chloride and calcium chloride.

All of the compositions herein may additionally comprise other materials commonly found in thermoplastic compositions, such as lubricants, fillers, reinforcing agents, dyes, pigments, antioxidants, and antiozonants. They may also include the addition of polymer to modify the impact strength such as Fusabond® EPDM rubbers, Surlyn ® ethylene copolymers, Kraton® rubbers, Elvaloy® ethylene copolymers and the like. These materials may be present in conventional amounts, which vary according to the type(s) of material(s) being added and their purpose in being added.

EXAMPLES AND COMPARATIVE EXAMPLES

The present invention is further defined in the following examples, in which all parts and percentages are by weight and degrees are Celsius, unless otherwise stated. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usage and conditions.

In the Examples, the following abbreviations are used:
GPC—gel permeation chromatography
PD—polydispersity index
MBL—α-methylenebutyrolactone
MeMBL—γ-methyl-α-methylenebutyrolactone
MMA—methyl methacrylate
Mn—number average molecular weight
Mw—weight average molecular weight
PD—polydispersity index
$T_g$—glass transition temperature (20° C./min. heating rate)
$T_d$—onset of decomposition temperature (20° C./min. heating rate)
NBA—n-butyl acrylate
DOS—sodium dioctylsulfosuccinate surfactant
Alma—allyl methacrylate
$K_2S_2O_8$—potassium persulfate initiator
EHT—2-ethylhexylthioglycolate chain transfer agent
GMA—glycidyl methacrylate
HEMA—hydroxyethyl methacrylate
EMA—ethyl methacrylate
CHMA—cyclohexyl methacrylate
BMA—butyl methacrylate
MAAM—methacrylamide
MAN—maleic anhydride
RI—refractive index
EDTA—ethylene diamine tetracetic acid Common reagents were obtained from Aldrich Chemical Co., Milwaukee, Wis., U.S.A. Paraloid® toughener was obtained from Rohm & Haas Co., Philadelphia, Pa., U.S.A. The molecular weight was determined by triple detector GPC with 2 Showdex® 80M columns, a Waters® 410 RI detector and a Viscotek® T60A light scattering and viscometry detector. The solvent was hexafluoroisopropanol and 0.01 M sodium triflate as the solvent using Zytel® 101 as a standard. Zytel® 101 was obtained from E.I. du Pont de Nemours & Co., Wilmington, Del.

Polymer blending was carried out with a 16 mm twin screw extruder, Welding Engineers Model TSE 16TC with a 3.2 mm die and 60 kPa of vacuum on port no. 3, and was operated at 250 rpm. Glass transition temperatures were measured by ASTM D3418 at a heating rate of 20° C./min and the $T_g$ measured as the midpoint of the transition. Notched Izod testing was carried out according to ASTM D256 on specimen about 0.1250.3175 cm thick. The flexural modulus was measured by ASTM D790. The tensile percent elongation was measured according to ASTM D638. Heat deflection temperature was determined according to ASTM D648 at 1.82 MPa load.

Transmission Electron Microscopy (TEM) was carried by sectioning molded plaques or pieces by cryo-ultramicrotomy. Sections of a nominal thickness 90 nanometer were accumulated in cold ethanol, transferred to water and retrieved on copper mesh grids. Images were obtained using a JEOL 1200 EX TEM operated at 100 KV accelerating voltage and recorded on sheet film.

Example 1

Preparation of MBL Homopolymer by Emulsion Polymerization

Step 1: Preparation of MBL Seed Polymer

A 5 L, 4-neck, round bottom flask equipped with a mechanical stirrer, addition funnel, condenser, and nitrogen inlet was charged with 2.7 L water and sparged with nitrogen for 30 min. A solution of MBL (150 g), EHT (0.58 g), and DOS (1.36 g, 0.003 mol) was added and the mixture was heated to 80° C. while stirring at 200 rpm. A solution of potassium persulfate (0.165 g) in 35 mL water was added over 5 min. Polymerization began immediately and the mixture turned from a cloudy-clear emulsion to a milky-white emulsion. The mixture was allowed to stir at 80° C. for 1 hour.

Step 2: Addition of MBL

A solution of potassium persulfate (0.39 g) in 150 mL water was added over 5 min to the milky-white emulsion obtained from step 1. A solution of MBL (400 g), EHT (1.6 g), and DOS (3.62 g) was added over 1 hour and then held for 1 hour at 80° C.

Step 3: Coagulation of MBL Homopolymer

See example 10 for coagulation of MBL homopolymer.

Example 2

Preparation of 1/1 MBL-MMA Copolymer by Emulsion Polymerization

Step 1: Preparation of MBL-MMA Seed Polymer

A 5L, 4-neck, round bottom flask equipped with a mechanical stirrer, addition funnel, condenser, and nitrogen inlet was charged with 2.7 L water and sparged with nitrogen for 30 min. A solution of MBL (75 g), MMA (75 g), EHT (0.73 g), and DOS (1.36 g) was added and the mixture was heated to 80° C. while stirring at 200 rpm. A solution of potassium persulfate (0.155 g) in 35 mL water was added over 5 minutes. Polymerization began immediately and the mixture turned from a cloudy clear emulsion to a milky white emulsion. The mixture was allowed to stir at 80° C. for 1 hour.

Step 2: Addition of MBL and MMA Monomer

A solution of potassium persulfate (0.39 g) in 75 mL water was added over 5 min to the cloudy emulsion mixture obtained from step 1. A solution of MBL (200 g), MMA (200 g), EHT (2.06 g), and DOS (3.62 g) was added over 1 hour, and then held for 1 hour at 80° C.

Step 3: Coagulation of MBL-MMA Copolymer

The polymer emulsion (from Step 2) was allowed to cool to room temperature and filtered through course frit filter paper. The emulsion was coagulated with 12L of a 1% $MgSO_4$ solution at 100° C. The slurry was allowed to cool and polymer was collected on a course frit filter and washed with water three times with 2L of water each time and dried to give 534 g (97%) of the MBL-MMA copolymer as a white solid. The polymer had the following properties:

TABLE 1

| Property | | Comments |
|---|---|---|
| $T_g$ | 144° C. | measured by DSC at 20° C./min heating rate |
| $T_d$ | 376° C. | measured by DSC at 20° C./min heating rate |
| Mn | 59,500 | measured by triple detector GPC |
| Mw | 146,000 | measured by triple detector GPC |
| PD = (Mw/Mn) | 2.4 | |

Examples 3–9

Using the general procedure described in Example 2, the following copolymers were prepared by emulsion polymerization of MBL.

TABLE 2

| Example No. | Composition | Weight Ratio | Yield(%) | $T_g$ ° C. | $T_d$ ° C. | Mn | Mw | PD |
|---|---|---|---|---|---|---|---|---|
| 3 | MBL/EMA | 1/1 | 97 | 121 | 367 | 43,500 | 127,200 | 2.9 |
| 4 | MBL/CHMA | 1/1 | 88 | 147 | 264 | 57,000 | 190,000 | 3.3 |
| 5 | MBL/Styrene | 1/1 | 95 | 154 | 392 | 43,100 | 168,000 | 3.9 |
| 6 | MBL/NBMA | 1/1 | 95 | 85 | 354 | 51,000 | 150,000 | 2.9 |
| 7 | MBL/MAN | 9/1 | 73 | 191 | 350 | 116,000 | 224,000 | 1.9 |
| 8 | MBL/HEMA | 9/1 | 96 | 194 | 370 | 120,400 | 436,300 | 3.6 |
| 9 | MBL/MAAM | 9/1 | 92 | 198 | 382 | 139,200 | 302,000 | 2.2 |

Example 10

Preparation of a Three-Layer MBL Core/Shell Particle with no Styrene in the n-Butyl Acrylate Layer to Match the Refractive Index Step 1: Preparation of an MBL Core A 5 L, 4-neck, round bottom flask equipped with a mechanical stirrer, addition funnel, condenser, and nitrogen inlet was charged with 2.4 L water, heated to 50° C., sparged with nitrogen for 30 min, and then allowed to cool to room temperature. A solution of MBL (110 g), allyl methacrylate (2.8 g), and DOS (1.0 g) was added to the flask and the mixture was heated to 80° C. while stirring at 200 rpm. A solution of potassium persulfate (0.121 g) in 50 mL water was added over 5 min. Polymerization began immediately and the mixture turned from a cloudy-clear emulsion to a milky-white emulsion. The mixture was allowed to stir at 80° C. for 1 hour and then sampled (approximately 1 mL drawn out) for particle size measurement.

Step 2: Preparation of Middle Layer

A solution of potassium persulfate (0.27 g) in 45 mL water was added over 5 min to the milky-white emulsion obtained from step 1. A solution of n-butyl acrylate (250 g), allyl methacrylate (6.4 g), and DOS (2.3 g) was added over 30 min and then held for 1 hour at 80° C. The mixture was sampled (approximately 1 mL drawn out) for particle size measurement.

Step 3: Preparation of MBL Shell

A solution of potassium persulfate (0.186 g) in 33 mL water was added over 5 min to the mixture obtained from step 2. A final charge of MBL (90 g) was added over 30 min and then held for 1 hour at 80° C. The mixture was sampled (approximately 1 mL drawn out) for particle size measurement. The emulsion was allowed to cool to room temperature and filtered through a course frit filter paper.

Step 4: Coagulation of MBL Core/shell Particle

The homopolymer emulsion (from example 1) was combined with the emulsion from step 3 above. The combined emulsion was added to 24 L of water containing 240 g $MgSO_4$ heated to 100° C. The polymer coagulates immediately and the slurry was brought back to reflux and held for one hour. After cooling, the solids were collected on a course frit filter and washed six times with 2 L water each time, and dried to give 955 g (95%) of the MBL core/shell particle mixed with MBL homopolymer as a white solid.

The coagulated polymer mixture from Example 10 was blended on a Prism® 16 mm twin screw extruder at 270° C. The resulting pellets were injection molded on a 1.5 ounce injection molding machine in to ASTM D648 flex bars and ASTM D638 tensile bars.

TABLE 3

| Blending | |
|---|---|
| Weight of coagulated polymer from example 10 | 955 g |
| Properties | |
| Flexural Strength (MPa) | 48.3 |
| Flexural Modulus (MPa) | 2832 |
| Tensile strength (MPa) | 36.7 |
| Tensile modulus (MPa) | 3439 |
| Elongation (%) | 1.33 |
| Notched Izod impact (J/m) | 17.0 |
| HDT (264 psi) (° C.) | 142 |

Example 11

Preparation of a Three-Layer MBL-MMA Core/ Shell Particle with Styrene in N-Butyl Acrylate Middle-Layer to Match the Refractive Index Step 1: Preparation of MBL-MMA Core A 5 L, 4-neck, round bottom flask equipped with a mechanical stirrer, addition funnel, condenser, and nitrogen inlet was charged with 1.5 L water, heated to 50° C., sparged with nitrogen for 30 min, and then allowed to cool to room temperature. A solution of MBL (68 g), MMA (68 g), ALMA (3.5 g), and DOS (1.23 g) was added to the flask and the mixture was heated to 80° C. while stirring at 200 rpm. A solution of potassium persulfate (0.141 g) in 31 mL water was added over 5 min. Polymerization began immediately and the mixture turned from a cloudy-clear emulsion to a milky-white emulsion. The mixture was allowed to stir at 80° C. for 1 hour and then sampled (approximately 1 mL drawn out) for particle size measurement.

Step 2: Preparation of RI-matched Rubbery Middle-layer

A solution of potassium persulfate (0.36 g) in 80 mL water was added over 5 min to the milky-white emulsion obtained from step 1. A solution of butyl acrylate (176 g), allyl methacrylate (9.0 g), styrene (138 g), and DOS (3.19 g) was added over 30 min and then held for 1 hour at 80° C. The mixture was sampled (approximately 1 mL drawn out) for particle size measurement.

Step 3: Preparation of MBL-MMA Shell

A solution of potassium persulfate (0.107 g) in 19 mL water was added over 5 min to the mixture of obtained as a result of step 2. A solution of MBL (52 g), MMA (52 g) was added over 30 min and then held for 1 hour at 80° C. The mixture was sampled (approximately 1 mL drawn out) for particle size measurement.

Step 4: Coagulation of MBL Core/shell Particle

The polymer emulsion (from Step 3) was allowed to cool to room temperature and filtered through course frit filter paper. The emulsion was coagulated with 9 L of a 1% $MgSO_4$ solution at 40° C. The coagulated slurry was heated to 80° C. to increase particle size and allow for faster filtration. The particles were collected on a course frit filter and washed three times with 2 L of water each time, and dried to give 550 g (97%) of the MBL core/shell particle as a white solid.

TABLE 4

| Steps | Particle Size in nanometer |
|---|---|
| 1 | 174 |
| 2 | 228 |
| 3 | 262 |

Example 12

Preparation of a Three-Layer MBL-MMA Core/Shell Particle Without Styrene in the n-Butyl Acrylate Middle-Layer to Match the Refractive Index Step 1: Preparation of an MBL-MMA Core A 5 L, 4-neck, round bottom flask equipped with a mechanical stirrer, addition funnel, condenser, and nitrogen inlet was charged with 2.0 L water, heated to 50° C., sparged with nitrogen for 30 min, and then allowed to cool to room temperature. A solution of MBL (68 g), MMA (68 g), allyl methacrylate (3.5 g), and DOS (1.23 g) was added and the mixture was heated to 80° C. while stirring at 200 rpm. A solution of potassium persulfate (0.141 g) in 31 mL water was added over 5 min. Polymerization began immediately and the mixture turned from a cloudy-clear emulsion to a milky-white emulsion. The mixture was allowed to stir at 80° C. for 1 hour and then sampled (approximately 1 mL drawn out) for particle size measurement.

Step 2: Preparation of Middle Layer

A solution of potassium persulfate (0.31 g) in 80 mL water was added over 5 min to the milky-white emulsion obtained from step 1. A solution of butyl acrylate (280 g), allyl methacrylate (7.2 g), and DOS (2.54 g) was added over 30 min and then held for 1 hour at 80° C. The mixture was sampled (approximately 1 mL drawn out) for particle size measurement.

Step 3: Preparation of MBL-MMA Shell

A solution of potassium persulfate (0.107 g) in 19 mL water was added over 5 min to the mixture of obtained as a result of step 2. A solution of MBL (52 g), MMA (52 g) was added over 30 min and then held for 1 hour at 80° C. The mixture was sampled (approximately 1 mL drawn out) for particle size measurement.

Step 4: Coagulation of MBL Core/shell Particle

The emulsion was coagulated with 9 L of a 1% $MgSO_4$ solution at 40° C. The polymer coagulated immediately and the slurry was heated to 80° C. to increase particle size and allow for faster filtration. The particles were collected on a course frit filter and washed three times with 2 L of water each time, and dried to give 510 g (96%) of the MBL core/shell particle as a white solid.

TABLE 5

| Steps | Particle Size in nanometer |
|---|---|
| 1 | 200 |
| 2 | 289 |
| 3 | 297 |

Example 13

Preparation of a Three-Layer MeMBL-MMA Core/Shell Particle with Styrene in the n-Butyl Acrylate Layer Step 1: Preparation of an MeMBL-MMA Core A 2 L, 4-neck, round bottom flask equipped with a mechanical stirrer, addition funnel, condenser, and nitrogen inlet was charged with 0.5 L water, heated to 50° C., sparged with nitrogen for 30 min, and then allowed to cool to room temperature. A solution of MeMBL (24 g), MMA (8 g), allyl methacrylate (0.8 g), and DOS (0.29 g) was added and the mixture was heated to 80° C. while stirring at 200 rpm. A solution of potassium persulfate (0.03 g) in 10 mL water was added over 5 min. Polymerization began immediately and the mixture turned from a cloudy-clear emulsion to a milky-white emulsion. The mixture was allowed to stir at 80° C. for 1 hour and then sampled (approximately 1 mL drawn out) for particle size measurement.

Step 2: Preparation of Middle-layer with Styrene in the n-Butyl Acrylate

A solution of potassium persulfate (0.083 g) in 23 mL water was added over 5 min to the milky-white emulsion obtained from step 1. A solution of n-butyl acrylate (50 g), allyl methacrylate (1.9 g), styrene (23 g) and DOS (0.7 g) was added over 30 min and then held for 1 hour at 80° C. The mixture was sampled (approximately 1 mL drawn out) for particle size measurement.

Step 3: Preparation of MeMBL-MMA Shell

A solution of potassium persulfate (0.036 g) in 6 mL water was added over 5 min to the mixture obtained in step 2. A solution of MeMBL (20 g), MMA (6.6 g) was added over 30 min and then held for 1 hour at 80° C. The mixture was sampled (approximately 1 mL drawn out) for particle size measurement.

Step 4: Coagulation of MBL Core/shell Particle

Figure 2:
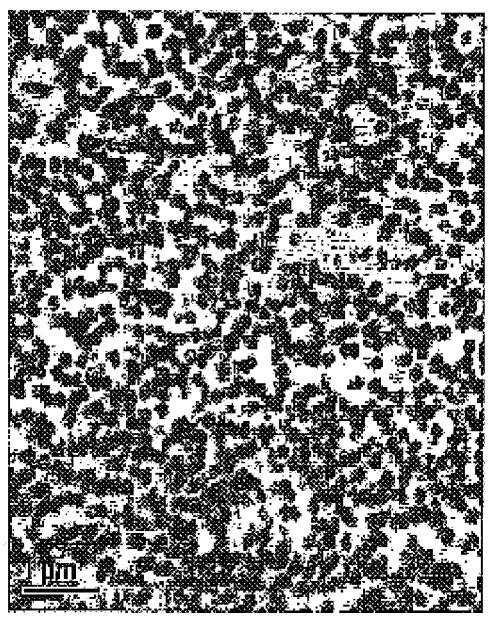
FIG. 2 is a TEM analysis of NBA/Styrene//MeMBL/MMA core//shell particles corresponding to Example 23.
Figure 3:
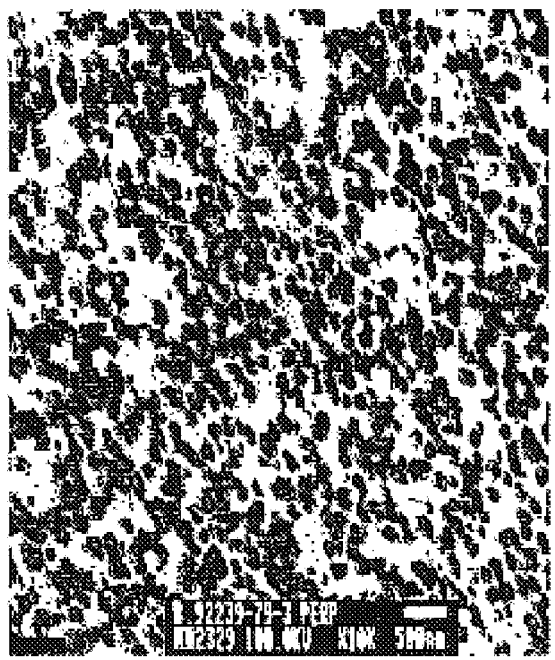
FIG. 3 is a TEM analysis of the polymer blend from Example 25 showing good dispersion of the MBL-MMA core/shell particles in the MBL-MMA copolymer matrix.

The emulsion from step 3 was filtered and then added to a flask containing 2.5 L water and 25 g $MgSO_4$ at 50° C. The polymer coagulated immediately and the slurry was heated to 80° C. to increase particle size and allow for faster filtration. The particles were collected on a course frit filter and washed three times with 2 L of water each time, and dried to give 121 g (90%) of the MeMBL core/shell particle as a white solid. A sample of the polymer was pressed at 260° C. under 20,000 psi pressure to a thin, transparent film. A TEM analysis was performed on this sample, as shown in FIG. 2.

TABLE 6

| Steps | Particle Size in nanometer |
|---|---|
| 1 | 166 |
| 2 | 211 |
| 3 | 254 |

Example 14

Preparation of a Three-Layer MeMBL-MMA Core/Shell Particle without Styrene in the n-Butyl Acrylate Middle-Layer to Match the Refractive Index Step 1: Preparation of an MeMBL-MMA Core A 5 L, 4-neck, round bottom flask equipped with a mechanical stirrer, addition funnel, condenser, and nitrogen inlet is charged with 2.0 L water, heated to 50° C., sparged with nitrogen for 30 min, and then allowed to cool to room temperature. A solution of MeMBL (68 g), MMA (68 g), allyl methacrylate (3.5 g), and DOS (1.23 g) is added and the mixture was heated to 80° C. while stirring at 200 rpm. A solution of potassium persulfate (0.141 g) in 31 mL water is added over 5 min. Polymerization begins immediately and the mixture turns from a cloudy-clear emulsion to a milky-white emulsion. The mixture is allowed to stir at 80° C. for 1 hour and then sampled (approximately 1 mL drawn out) for particle size measurement.

Step 2: Preparation of Middle Layer

A solution of potassium persulfate (0.31 g) in 80 mL water is added over 5 min to the milky-white emulsion obtained from step 1. A solution of butyl acrylate (280 g), allyl methacrylate (7.2 g), and DOS (2.54 g) is added over 30 min and then held for 1 hour at 80° C. The mixture is sampled (approximately 1 mL drawn out) for particle size measurement.

Step 3: Preparation of MeMBL-MMA Shell

A solution of potassium persulfate (0.107 g) in 19 mL water is added over 5 min to the mixture of obtained as a result of step 2. A solution of MeMBL (52 g), MMA (52 g) is added over 30 min and then held for 1 hour at 80° C. The mixture is sampled (approximately 1 mL drawn out) for particle size measurement.

Step 4: Coagulation of MeMBL Core/shell Particle

The emulsion is coagulated with 9 L of a 1% $MgSO_4$ solution at 40° C. The polymer coagulates immediately and the slurry is heated to 80° C. to increase particle size and allow for faster filtration. The particles are collected on a course frit filter and washed three times with 2 L of water each time, and dried to give 510 g (96%) of the MeMBL core/shell particle as a white solid.

Example 15

Preparation of a Cross-Linked MBL Homopolymer Particle

Step 1: Preparation of an MBL Seed Particle

A 5 L, 4-neck, round bottom flask equipped with a mechanical stirrer, addition funnel, condenser, and nitrogen inlet was charged with 3 L water, heated to 50° C., sparged with nitrogen for 30 minutes. A solution of MBL (97.5 g), allyl methacrylate (2.5 g), 1-dodecanethiol (0.2 g), and DOS (2.5 g) was added and the mixture was heated to 80° C. while stirring at 200 rpm. A solution of potassium persulfate (0.2 g) in 10 mL water was added all at once. Polymerization began immediately and the mixture turned from a cloudy-clear emulsion to a milky-white emulsion. The mixture was allowed to stir at 80° C. for 1 hour.

Step 2: Addition of More MBL Monomer

A solution of potassium persulfate (0.6 g) in 10 mL water was added over 5 min to the milky white emulsion obtained from step 1. A solution of MBL (297 g), DOS (7.5 g), Alma (3 g), and water (20 mL) was added over 60 min and then held for 1 hour at 80° C.

Step 3: Coagulation of MBL Particle

The emulsion from step 3 was filtered, sampled for particle size measurement, and then added to a flask containing 4.4 L water and 44 g $MgSO_4$ at 100° C. The polymer coagulated immediately and the slurry was heated back to 100° C. to allow for faster filtration. The particles were collected on a course frit filter and washed with water (3 ×2 L) and dried to give 381 g (95%) of the MBL particles as a white solid.

TABLE 7

| Property | |
|---|---|
| $T_g$ | 195° C. |
| $T_d$ | 380° C. |
| Particle Size | 302 nm |

Example 16

Preparation of a Cross-linked MeMBL Homopolymer Particle

Step 1: Preparation of an MeMBL Seed Particle

A 5 L, 4-neck, round bottom flask equipped with a mechanical stirrer, addition funnel, condenser, and nitrogen inlet is charged with 3 L water, heated to 50° C., sparged with nitrogen for 30 minutes. A solution of MeMBL (97.5 g), allyl methacrylate (2.5 g), 1-dodecanethiol (0.2 g), and DOS (2.5 g) is added and the mixture is heated to 80° C. while stirring at 200 rpm. A solution of potassium persulfate (0.2 g) in 10 mL water is added all at once. Polymerization begins immediately and the mixture turns from a cloudy-clear emulsion to a milky-white emulsion. The mixture is allowed to stir at 80° C. for 1 hour.

Step 2: Addition of More MeMBL Monomer

A solution of potassium persulfate (0.6 g) in 10 mL water is added over 5 min to the milky white emulsion obtained from step 1. A solution of MeMBL (297 g), DOS (7.5 g), Alma (3 g), and water (20 mL) is added over 60 min and then held for 1 hour at 80° C.

Step 3: Coagulation of MeMBL Particle

The emulsion from step 3 is filtered, sampled for particle size measurement, and then added to a flask containing 4.4 L water and 44 g $MgSO_4$ at 100° C. The polymer coagulates immediately and the slurry is heated back to 100° C. to allow for faster filtration. The particles are collected on a course frit filter and washed with water (3×2 L) and dried to give 381 g (95%) of the MeMBL particles as a white solid.

Example 17

Preparation of a Cross-Linked MBL Particle containing Methacrylic Acid

Step 1: Preparation of MBL Seed Particle

A 5 L, 4-neck, round bottom flask equipped with a mechanical stirrer, addition funnel, condenser, and nitrogen inlet was charged with 2.2 L water, heated to 50° C., sparged with nitrogen for 30 min. A solution of MBL (100 g), allyl methacrylate (2.8 g), methacrylic acid (11.4 g), and DOS (1.1 g) was added and the mixture was heated to 80° C. while stirring at 200 rpm. A solution of potassium persulfate (0.11 g) in 10 mL water was added all at once. Polymerization began immediately and the mixture turned from a cloudy-clear emulsion to a milky-white emulsion. The mixture was allowed to stir at 80° C. for 1 hour.

Step 2: Addition of More MBL Monomer

A solution of potassium persulfate (0.3 g) in 10 mL water was added over 5 min to the milky white emulsion obtained from step 1. A solution of MBL (250 g), DOS (2.8 g), Alma (7.1 g), methacrylic acid (28 g), and water (20 mL) was added over 60 min and then held for 1 hour at 80° C.

Step 3: Coagulation of MBL Particle

The emulsion from step 3 was filtered, sampled for particle size measurement, and then added to a flask containing 2 L water and 20 g $MgSO_4$ at 100° C. The polymer coagulated immediately and the slurry was heated back to 100° C. to allow for faster filtration. The particles were collected on a course frit filter and washed three times with 2 L water each time, and dried to give 319 g (79%) of the MBL particles as a white solid.

TABLE 8

| Property | |
|---|---|
| Tg | 202° C. |
| Td | 362° C. |
| Particle Size | 505 nm |

Example 18

Preparation of a Cross-Linked MBL Particle containing Maleic Anhydride

Step 1: Preparation of an MBL Seed Particle

A 5 L, 4-neck, round bottom flask equipped with a mechanical stirrer, addition funnel, condenser, and nitrogen inlet was charged with 2.7 L water, heated to 50° C., sparged with nitrogen for 30 min. A solution of MBL (150 g), allyl methacrylate (3.8 g), and DOS (1.4 g) was added and the mixture was heated to 80° C. while stirring at 200 rpm. A solution of potassium persulfate (0.16 g) in 10 mL water was added all at once. Polymerization began immediately and the mixture turned from a cloudy-clear emulsion to a milky white emulsion. The mixture was allowed to stir at 80° C. for 1 hour.

Step 2: Addition of More MBL Monomer

A solution of potassium persulfate (0.4 g) in 10 mL water was added over 5 min to the milky-white emulsion obtained from step 1. A solution of MBL (400 g), DOS (3.6 g), Alma (10.2 g), maleic anhydride (4 g), and water (150 mL) was added over 60 min and then held for 1 hour at 80° C.

Step 3: Coagulation of MBL Particle

The emulsion from step 3 was filtered, sampled for particle size measurement and isolated as above to give the polymer as a white solid.

TABLE 9

| Property | |
|---|---|
| $T_g$ | 200° C. |
| $T_d$ | 360° C. |
| Particle Size | 477 nm |

Example 19

Preparation of a Cross-Linked MeMBL Particle containing Methacrylic Acid

Step 1: Preparation of MeMBL Seed Particle

A 5 L, 4-neck, round bottom flask equipped with a mechanical stirrer, addition funnel, condenser, and nitrogen inlet is charged with 2.2 L water, heated to 50° C., sparged with nitrogen for 30 min. A solution of MeMBL (100 g), allyl methacrylate (2.8 g), methacrylic acid (11.4 g), and DOS (1.1 g) is added and the mixture is heated to 80° C. while stirring at 200 rpm. A solution of potassium persulfate (0.11 g) in 10 mL water is added all at once. Polymerization begins immediately and the mixture turns from a cloudy-clear emulsion to a milky-white emulsion. The mixture is allowed to stir at 80° C. for 1 hour.

Step 2: Addition of More MeMBL Monomer

A solution of potassium persulfate (0.3 g) in 10 mL water is added over 5 min to the milky white emulsion obtained from step 1. A solution of MeMBL (250 g), DOS (2.8 g), Alma (7.1 g), methacrylic acid (28 g), and water (20 mL) is added over 60 min and then held for 1 hour at 80° C.

Step 3: Coagulation of MeMBL Particle

The emulsion from step 3 is filtered, sampled for particle size measurement, and then added to a flask containing 2 L water and 20 g $MgSO_4$ at 100° C. The polymer coagulates immediately and the slurry is heated back to 100° C. to allow for faster filtration. The particles are collected on a course frit filter and washed three times with 2L water each time, and dried to give 319 g (79%) of the MeMBL particles as a white solid.

Example 20

Preparation of a Cross-Linked MeMBL Particle containing Maleic Anhydride

Step 1: Preparation of an MeMBL Seed Particle

A 5 L, 4-neck, round bottom flask equipped with a mechanical stirrer, addition funnel, condenser, and nitrogen inlet is charged with 2.7 L water, heated to 50° C., sparged with nitrogen for 30 min. A solution of MeMBL (150 g), allyl methacrylate (3.8 g), and DOS (1.4 g) is added and the mixture is heated to 80° C. while stirring at 200 rpm. A solution of potassium persulfate (0.16 g) in 10 mL water is added all at once. Polymerization begins immediately and the mixture turns from a cloudy-clear emulsion to a milky white emulsion. The mixture is allowed to stir at 80° C. for 1 hour.

Step 2: Addition of More MeMBL Monomer

A solution of potassium persulfate (0.4 g) in 10 mL water is added over 5 min to the milky-white emulsion obtained from step 1. A solution of MeMBL (400 g), DOS (3.6 g), Alma (10.2 g), maleic anhydride (4 g), and water (150 mL) is added over 60 min and then held for 1 hour at 80° C.

Step 3: Coagulation of MeMBL Particle

The emulsion from step 3 is filtered, sampled for particle size measurement and isolated as above to give the polymer as a white solid.

Example 21

Preparation of a 25/75 MeMBL-MMA Copolymer

Using the general procedure described in Example 2, a 125/75 MeMBL-MMA copolymer was prepared. The polymer had a Tg of 130° C., Td 342° C., Mn 56,400, Mw 110,000, PDI 1.95.

Example 22

Preparation of a Two-Layer NBA/Styrene// MeMBL/MMA Core//Shell Particle for Toughening a 25/75 MeMBL-MMA Resin

Step 1: Preparation of an Butyl Acrylate/Styrene Core

A 5 L, 4-neck, round bottom flask equipped with a mechanical stirrer, addition funnel, condenser, and nitrogen inlet was charged with 1.4 L water and heated to 80° C. while sparging with nitrogen. A solution of NBA (138 g), allyl methacrylate (4.8 g), styrene (54 g) and DOS (1.9 g) was prepared and 20 mL of this solution was added to the flask while stirring at 200 rpm. A solution of potassium persulfate (0.38 g) in 50 mL water was added over 5 min. Polymerization began immediately and the mixture turned from a cloudy-clear emulsion to a milky-white emulsion. The remainder of the monomer solution was added over 30 min. The mixture was then allowed to stir at 80° C. for 1.5 hours and then sampled (approximately 1 mL drawn out) for particle size measurement. Particle size was 221 nm by light scattering measurement.

Step 2: Preparation of MeMBL/MMA Shell

A solution of potassium persulfate (0.096 g) in 33 mL water was added over 5 min to the emulsion obtained from step 1. A solution of MeMBL (12 g), MMA (36 g), DOS (0.48 g), and EHT (0.48 g) was added over 1 hour and then held for 1 hour at 80° C. The emulsion was allowed to cool to room temperature and filtered through a course frit filter paper. Particle size was 257 nm by light scattering measurement.

Step 3: Coagulation of NBA/Styrene//MeMBL/MMA Core// shell Particle

The polymer emulsion (from Step 2) was coagulated with 2 L of a 1% $MgSO_4$ solution at 40° C. The particles were collected on a course frit filter and washed three times with 2 L of water each time, and dried to give 237 g of the core/shell particle as a white solid.

Example 23–24

Mixing the NBA/Styrene//MeMBL/MMA Core// Shell Toughener with a MeMBL-MMA Copolymer

A 25/75 MeMBL-MMA copolymer (made as illustrated in example 17), was mixed with the core/shell toughener (made as illustrated in example 18) in a Prism® 16 mm, twin-screw extruder at 250° C. The resulting pellets were injection molded on a 1.5 ounce injection molding machine in to ASTM D648 flex bars and ASTM D638 tensile bars. The test specimens were transparent had a good balance of HDT and toughness, as shown in the table below.

TABLE 10

| | Example No. | |
|---|---|---|
| | 23 | 24 |
| Extrusion Blending | | |
| Polymer From Example 17 (g) | 450 | 350 |
| Core/shell particle from Example 18 (g) | 150 | 250 |
| Weight % core/shell particle | 25 | 42 |
| Injection Molding and Physical Testing | | |
| Flexural Modulus (MPa) | 2535 | 1764 |
| Tensile strength (MPa) | 50 | 37 |
| Elongation (%) | 4.3 | 19.3 |
| Notched-Izod impact (J/m) | 20 | 46 |
| HDT (264 psi) (° C.) | 87 | 80 |

Examples 25–27

Mixing the MBL-MMA Copolymer with Core/Shell Tougheners

MBL-MMA copolymers (made as illustrated in example 1), were mixed with core/shell tougheners (made as illustrated in example 2 and example 3) in a Prism® 16 mm twin-screw extruder at 240° C. The resulting pellets were injection molded on a 1.5 ounce injection molding machine in to ASTM D648 flex bars and ASTM D638 tensile bars.

TABLE 10

| | Example No. | | |
|---|---|---|---|
| | 25 | 26 | 27 |
| Extrusion Blending | | | |
| Polymer From Example 1 (g) | 530 | 530 | 549 |
| Core/shell particle from Example 11, (g) | 201 | 350 | — |
| Core/shell particle from Example 12, (g) | — | — | 509 |
| Weight % core/shell particle | 27 | 40 | 48 |
| Extrusion temperature ° C. | 250 | 250 | 250 |
| Appearance | transparent | transparent | opaque white |
| Injection Molding and Physical Testing | | | |
| Flexural Strength (MPa) | 67.4 | 54.8 | 46.0 |
| Flexural Modulus (MPa) | 3576 | 2894 | 2439 |
| Tensile strength (MPa) | 43.8 | 44.2 | 42.9 |
| Tensile modulus (MPa) | 2260 | 2109 | 2315 |
| Elongation (%) | 2.4 | 3.6 | 2.7 |
| Notched-Izod impact (J/m) | 11.2 | 11.7 | 19.9 |
| HDT (264 psi) (° C.) | 108.9 | 106.6 | 107.6 |

Example 28

Synthesis of a MBL-Glycidyl Methacrylate-Copolymer via Low-Temperature Emulsion Polymerization Using a Redox-type Initiator System

Step 1: Preparation of an MBL-GMA Seed Emulsion

A 5 L, 4-neck, round bottom flask equipped with a mechanical stirrer, addition funnel, condenser, and nitrogen inlet was charged with 1.8 L water and sparged with nitrogen at room temp. for 30 min. To this was added MBL (45 g), glycidyl methacrylate (5 g), DOS (0.5 g), sodium formaldehyde sulfoxylate dihydrate (0.3 g), and ethylhexylthioglycolate (0.15 g) with stirring at 200 rpm. A stock solution of EDTA tetrasodium salt hydrate (3 g), Iron sulfate heptahydrate (2 g), and water (100 g) was prepared and 1.2 mL of this solution was added to the monomer emulsion. A solution of t-butyl hydroperoxide (0.3 g, 0.46 mL of a 70% solution in water) was added all at once. Polymerization began immediately and the mixture turned from a cloudy-clear emulsion to a milky-white emulsion. The mixture was allowed to stir at room temperature for 1 hour.

Step 2: Addition of More Monomer

A solution of t-butyl hydroperoxide (1.2 g, ⅛ mL of a 70% solution in water) in 10 mL water was added all at once. A solution of MBL (180 g), GMA (20 g), DOS (2 g), sodium formaldehyde sulfoxylate dihydrate (1.2 g), EHT (0.6 g) and 10 mL water was added over 60 min and then held for 1 hour at room temp. The temperature rose from 21° C. to 32° C. during the course of the polymerization.

Step 3: Freeze Drying the Copolymer Emulsion

The polymer emulsion was freeze dried to give 253 g dried polymer.

TABLE 11

| Property | |
|---|---|
| $T_g$ | 185° C. |
| $T_d$ | 361° C. |
| Mn | 85,200 |
| Mw | 221,000 |
| PD | 2.6 |

Examples 29–32

Nylon Blends and Nylon Control

The polymers from examples 25–27 were blended on a Prism® 16 mm, twin screw extruder at 280° C. with Nylon 6,6 (Zytel 101®). The resulting pellets were injection molded on a 1.5 ounce injection molding machine in to ASTM D648 flex bars and ASTM D638 tensile bars.

TABLE 14

| Example No. | Blend Composition | HDT@264 psi (° C.) | Flex Modulus (MPa) |
|---|---|---|---|
| 29 | Zytel ® 101 control | 71 | 2832 |
| 30 | Polymer from Example 14, 40% Zytel ® 101, 60% cross-linked MBL homopolymer | 118 | 2680 |
| 31 | Polymer from Example 15, 40% Zytel ® 101, 60% cross-linked MBL polymer with methacrylic acid | 108 | 3804 |
| 32 | Polymer from Example 16, 40% Zytel ® 101, 60% cross-linked MBL with maleic anhydride | 112 | 3046 |

What is claimed is:

1. A process for producing an acrylic copolymer comprising the sequential steps of:

(a) graft polymerizing α-methylene-γ-butyrolactone or γ-methyl-α-methylene-γ-butyrolactone onto a polymerized butadiene or butadiene-copolymer to form a latex, and (b) isolating the resulting latex by coagulation, freeze drying, or spray drying.

* * * * *